Figure 7:
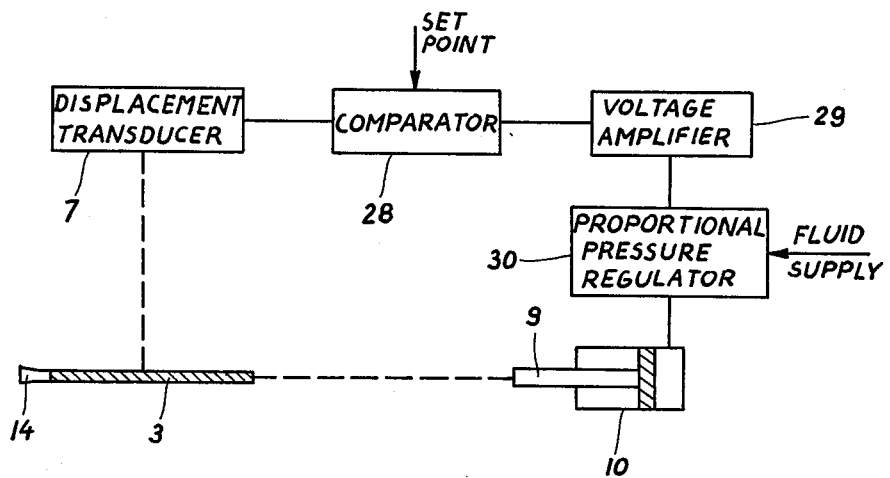

United States Patent [19]

Bonac

[11] 4,237,757
[45] Dec. 9, 1980

[54] BANDSAW MECHANISM

[76] Inventor: Tomo Bonac, 3636 W. 30th Ave., Vancouver, B.C., Canada, V6S 1W8

[21] Appl. No.: 965,519

[22] Filed: Dec. 1, 1978

[30] Foreign Application Priority Data

Dec. 7, 1977 [CA] Canada ................................. 292599

[51] Int. Cl.³ ........................ B23D 55/08; B23D 55/10
[52] U.S. Cl. .......................................... 83/74; 83/814; 83/820
[58] Field of Search ............... 83/72, 74, 75, 814–819, 83/820

[56] References Cited

U.S. PATENT DOCUMENTS

| 2,903,027 | 9/1959 | Edgemond, Jr. | 83/817 |
| 2,914,100 | 11/1959 | Lindholm | 83/74 |

Primary Examiner—J. M. Meister

[57] ABSTRACT

A system for introducing "tensioning" stress distribution into the wide bandsaw blade without its plastic deformation, for automatically compensating for blade temperature expansions and blade manufacturing inaccuracies, and for controlling blade position on the bandsaw wheels, comprising: torsional loading of the back, noncutting section of the bandsaw blade by using two actuators acting as a couple; continuously sensing for a displacement of the bandsaw blade during sawing from a set position on the wheels and countering the adverse effect of such displacement by generating a corrective displacement in the opposite sense relative to the said set position through the change of the ratio of forces forming the said couple.

10 Claims, 9 Drawing Figures

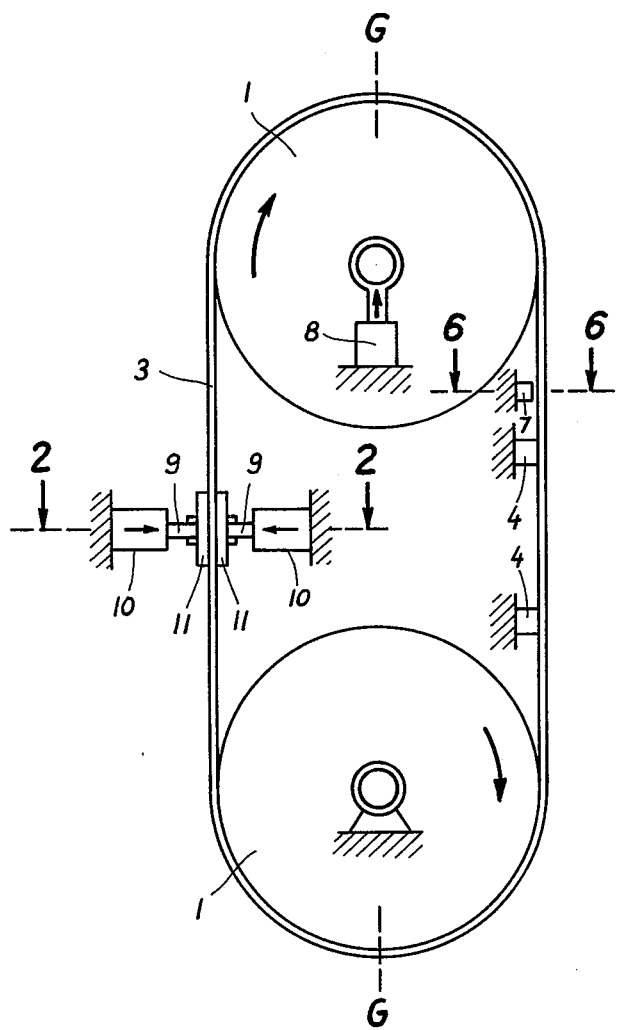
Fig. 1
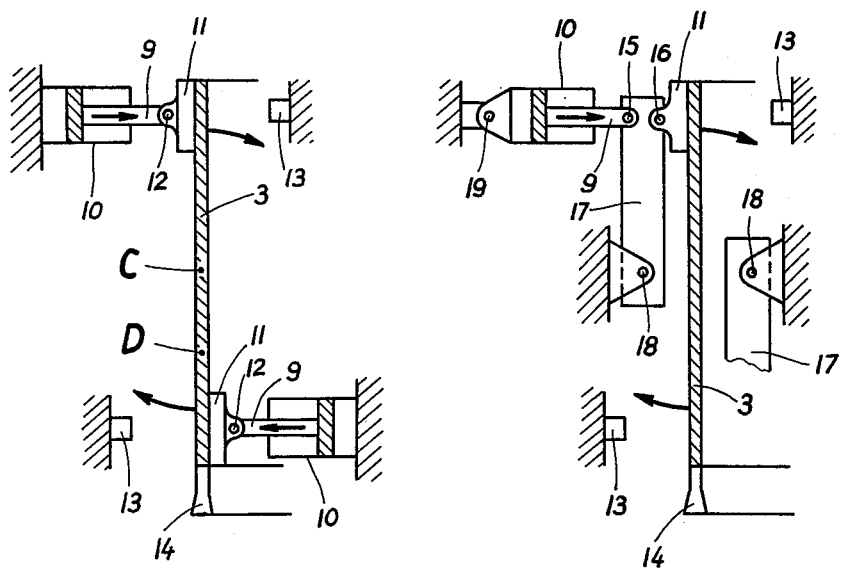
Fig. 2
Fig. 3

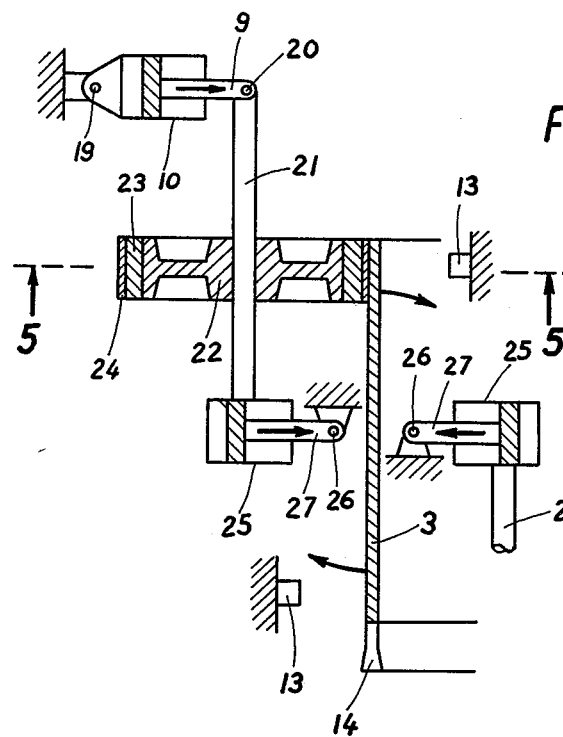
Fig. 4
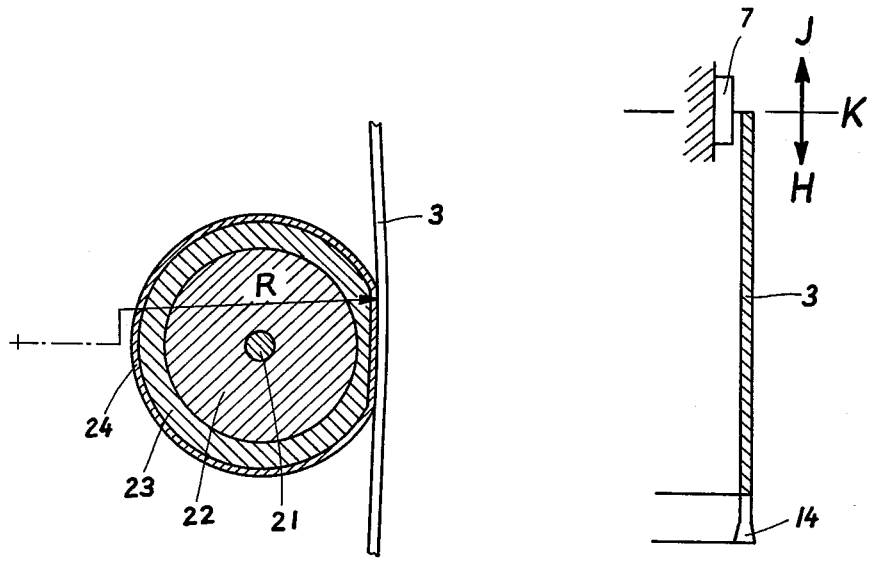
Fig. 5
Fig. 6

BANDSAW MECHANISM

This invention relates to wide blade bandsaws and, in particular, to a system for introducing "tensioning" stress distribution into the blade, for automatically compensating for temperature expansions and manufacturing inaccuracies of bandsaw blades, and for controlling blade position on the bandsaw wheels.

Bandsaw blade, as a cutting tool, has to perform a demanding job. It has to bend over two wheels while moving at a fairly high velocity and it has to retain its position on the wheels while being subjected to inplane and lateral cutting forces as well as to temperature changes in its cutting region. At the same time the blade is required to deviate laterally from its true line between the guides as little as possible.

The present practice of preparing bandsaw blades and of adjusting bandsaws to meet the foregoing requirements includes wheel tilting and blade prestressing ("tensioning").

Normally only the upper wheel is tilted to compensate for the difference in lengths of the blade edges resulting from manufacturing inaccuracies, for cutting forces, and for temperature expansions in the blade cutting region. This method requires frequent tilting corrections and does not assure the optimal position of the blade on the bandsaw wheels, i.e. the position where only the teeth hang over the wheel edge. If a part of the blade body hangs over the wheel edge the temperature of the teeth region is increased due to reduced heat convection from the overhang to the wheels thus contributing to an already unfavourable stress distribution in the saw blade caused by the lack of support of the blade.

"Tensioning" of a bandsaw blade is acomplished by the longitudinal rolling which plastically deforms its central region in order to pretension the front blade edge (i.e. the edge carrying teeth) and the back blade edge. The idea is to provide compensation for the temperature expansions in the teeth region, to increase blade stability on the wheels and to increase blade torsional rigidity. However, since the prestress distribution is achieved by means of plastic deformation and since the blade is constantly bent over the wheels, torsional rigidity deteriorates rapidly which usually results in blade snaking. The original prestress distribution of the blade has to be frequently restored. A further disadvantage of "tensioning" the bandsaw blade using plastic deformation is that no reliable method for nondestructive measurement of the residual stresses exists to guarantee tightly controlled prestresses. It seems that the bandsaw blade technology has reached the point where the lift of the tooth edge sharpness exceeds the life of the saw blade body. Introduction of stelite tipping increased considerably the life of the edge sharpness and the reason for changing such blades so frequently is fatigue of the bandsaw blade body.

The present invention overcomes the foregoing and other drawbacks involved in bandsawing by providing a novel method of introducing "tensioning" stress distribution into the bandsaw blade as well as by automatic control of the optimal blade position on the wheels. In brief, the noncutting section of the blade is torsionally loaded within the material elastic limits. This causes higher tensile stresses at the blade edges than in the blade central region. Such stress distribution introduced into the back, noncutting section of the blade between the wheels is carried over the upper wheel into the cutting section while the wheels rotate. One advantage of the present invention is that the bandsaw blade does not have to be prestressed thus eliminating the costly operation. Another advantage is that the blade body fatigue is reduced because solely the elastic deformations are involved. Still another advantage is that the blade stress distribution does not change with cutting time because constant torsional forces are applied. The sawing accuracy is thus increased because the influence of the saw blade fatigue is eliminated. Furthermore, it is an advantage of the present invention that inaccuracies in the blade manufacturing and nonparallelism of the bandsaw wheel axes are compensated thus reducing or eliminating the wheel tilting adjustments. Still further advantage of the present invention is that any temperature expansions of the blade are compensated automatically without causing a change of stress distribution in the blade.

Automatic control of the blade position on the wheels employs the tendency of the saw blade to move in the direction of smaller stress until an equilibrium of stresses is reached. A displacement transducer is provided between the upper guide and the upper wheel to sense the position of the blade on the wheels. The signal from the transducer is processed to increase or decrease the ratio of the torsional forces employed for introducing "tensioning" stress distribution thus correcting the position of the blade on the wheels relative to a set blade position. The advantage of this position control system is that the blade position on the wheels is kept constant irrespective of the cutting forces thus making it possible to maintain the overhang of the blade at a minimum.

Figure 8:
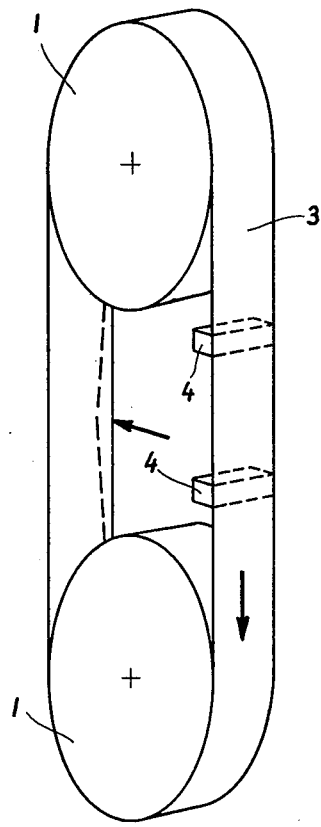
Figure 9:
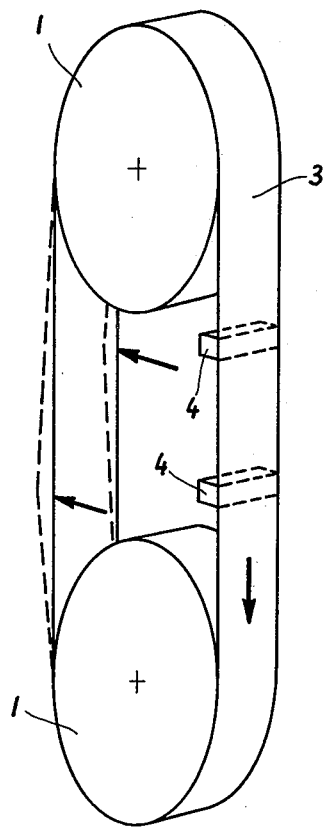

In drawings which illustrate embodiments of the invention,

FIG. 1 is a front elevation of a bandsaw mechanism incorporating an exemplary embodiment of the blade torsional loading system and the displacement transducer, with some parts omitted for clarity, FIG. 2 is a partial section taken substantially along line 2—2 of FIG. 1, FIG. 3 is a partial section of another exemplary embodiment of the present invention taken the same way as in FIG. 2, FIG. 4 is a partial section of still another exemplary embodiment of the present invention taken the same way as in FIG. 2, FIG. 5 is a section along line 5—5 of FIG. 4, FIG. 6 is a partial section taken along line 6—6 of FIG. 1, FIG. 7 is a block diagram of the blade position control system, FIG. 8 is a perspective view of a bandsaw mechanism showing the force applied by the twisting loading system in accordance with the first modified form of this invention, and FIG. 9 is a perspective view of a bandsaw mechanism showing the forces applied by the double twisting loading system in accordance with the second modified form of this invention.

Refering to the drawings, FIG. 1 shows the general arrangement of the bandsaw. The basic components of the bandsaw are two wheels 1, the bandsaw blade 3, and the tensioning system 8 which normally applies forces to the upper wheel to tension the blade 3. The section of the bandsaw blade between the two guides 4 performs the acutal sawing. As shown in FIGS. 1 and 2 the torsional loading of the bandsaw blade is acomplished by means of two identical actuators 10, one applying force at the back edge of the blade and the other at the blade front edge carrying teeth 14. The actuators 10 can be of any kind (hydraulic, pneumatic, electromagnetic, machine screw) although the rolling diaphragm pneumatic cylinders are prefered in this case due to short response time and due to low friction. In the Figures of the present invention actuators 10 and 25 are shown as pneumatic cylinders.

In the simplest design of torsional loading system, as shown in FIGS. 1 and 2, the actuators 10 are rigidly end mounted on the bandsaw base and the sliding pads 11 are pivot 12 mounted on the piston rods 9. If the upper wheel tilting (tilting is the angle between the wheel axes which lie in plane G—G) is such that the tensile stress distribution is uniform across the width of the blade 3, the blade 3 will rotate about the centre point C when equal forces are applied by the actuators 10. At any other tilting of the upper wheel and at the same forces applied by the actuators 10 the blade 3 will rotate about some other point, e.g. about point D. Departure of the rotation point from the point C is caused by nonparallelism of axes of the bandsaw wheels 1 in the plane G—G and/or by the difference between the back and the front edge lengths of the saw blade 3. The torsional loading system thus automatically compensates for the nonparallelism of wheel axes and the difference of the blade edge lengths by allowing free movement of the blade rotation point. However, at the constant forces applied by the tensioning system 8 and the equal forces applied by actuators 10 the torsional deflection of the blade 3 is minimal only if the blade rotates about point C. A departure of the rotation point from point C causes increase of torsional deflection and eventually the pads 11 can slip of the blade. Also the said departure causes a difference between the positions of the pads on the blade 3, thus in effect causing a relative increase of the tensile stresses at one edge of the blade with respect to the stresses at the other edge. If such stresses are close to the blade material elastic limit or if the pads 11 are close to slipping off the blade such increased torsional deflection is critical. Therefore, critical torsional deflection of the blade is registered by one of the two end switches 13 signalling alarm when the correction of tilting is required. If back edge of the blade is signaled to be excessive such direction of tilting correction should take place as to increase tensile stresses at the back edge of the blade. Analogous correction is required if deflection of the front edge of the blade is excessive. Only when the bandsaw wheel axes are close enough to the parallel and the back bandsaw blade length is close enough to its front edge length, for all bandsaw blades, wheel tilting mechanism can be eliminated thus consequently simplifying the design of the bandsaw.

FIG. 3 shows the blade torsional loading system which is efficient at larger blade torsional deflections than the system shown in FIG. 2. The actuators 10 are rear pivot 19 mounted on the base of the bandsaw and the piston rods 9 are pivot 15 connected to the rods 17 which rotate about the pivots 18 also mounted on the base of the bandsaw. The sliding pads 11 are pivot 16 mounted on the same end of the rods 17 as the piston rods 9. Since te sliding pads 11 in fact rotate about the pivots 18 and pads 11 can not slide off the blade and the difference between the tensile stresses at the blade edges is smaller as in the case of the torsional loading system shown in FIG. 2.

The sense of the blade torsion affects fatigue of the blade. The bending stresses are known to be more damaging to the saw blade edge carrying teeth because stresses concentrate around gullets. Therefore, the blade torsion causing bending of the toothed edge in the same sense as the blade is bent over the wheels, is superior. This superior sense of torsion is shown in FIGS. 2 to 4.

The sliding pads should be of abrasion resistant material and could be provided with a water supply to act as hydrodynamic bearings. However, since the contact area between the flat pads 11 and the blade 3 decrease with the blade torsional deflection some wear of the pad surfaces is unavoidable. A blade torsional loading system featuring reduction of wear of the contact surfaces is shown in FIG. 4. Instead of pads the rollers 22 are used to apply forces to the blade. The rollers 22 are mounted on the shafts 21 which are at one end rigidly mounted on the actuator 25 and at other end pivot 20 connected to the piston rods 9 of the actuators 10. The actuators 10 are rear pivot 19 mounted on the base of the bandsaw and the piston rods 27 are pivot 26 mounted on the base of the bandsaw. The face of each roller 22 is coated with a layer of flexible material 23, such as rubber, covered with a thin metal layer 24. Such design of the rollers allow a very large blade bending radius R as shown in FIG. 5. The bending stresses responsible for fatigue of the blade are thus minimal.

FIGS. 1 and 6 show the location of the displacement transducer 7 mounted on the bandsaw base so that it senses the position of the bandsaw blade 3 relative to the bandsaw wheels. FIG. 7 shows one example circuit of the blade position control system using a fluid cylinder as an actuator. A mechanical input to the displacement transducer 7 is provided by the controlled blade 3. The electrical signal from the displacement transducer is compared with a set point in the comparator 28 and the error signal corresponding to their difference exists as an output to the amplifier block 29. Amplification provides excitation of the proportional pressure regulator 30 connected with the fluid cylinder 10 acting on the back edge of the blade 3. If the set point optimal position of the bandsaw blade 3 is K as shown in FIG. 6 then deviation of the blade in the direction J causes such increase of the fluid pressure in the cylinder 10 that the blade returns to position K. On the other hand, if the bandsaw deviates in direction H its return to position K is accomplished by decreasing the fluid pressure in the same cylinder (i.e. the cylinder acting on the back edge of the blade).

The present invention has been thus described in its prefered form. However, two other forms of the modified invention are described below.

In the first modified form of the present invention the function of the torsional loading system is partly replaced by an appropriate wheel tilting. In such arrangement the wheel tilting is set in such way to result in relatively high tensile stresses at one edge of the blade preferably at the front edge carrying teeth. The appropriate equilibrium tensile stresses at the opposite edge are achieved by applying a loading system which is one half of the symetrical torsional loading system shown in FIGS. 2, 3, or 4. Such loading system twists the back noncutting section of the saw blade as shown in FIG. 8. The same blade position control system as shown in FIG. 7 can be used. Although this form of the invention exhibits a reduction in the number of the loading system parts it allows a lower ratio between the stresses at the edges and at the center of the bandsaw blade if compared with the prefered form of the present invention.

The second modified form of the present invention is shown in FIG. 9. A favourable stress distribution in te blade is achieved by two actuators located on one side of the back, noncutting section of the saw blade. The actuators act in two parallel planes, each plane being perpendicular to the blade surface and perpendicular to the edges of the blade. Both actuators apply forces in the same direction, however, such one on a different edge of the blade. A large distance between the planes is provided to assure that the blade center is not considerably laterally deflected by the action of the actuators. The same blade position control system as shown in FIG. 7 can be used. Although this form of the invention results in a size reduction of the bandsaw as compared to the prefered form of the present invention it allows only low blade stress ratio similarly as the first modified form of the present invention.

I claim:

1. In a bandsaw mechanism having a frame and a saw blade trained over two wheels, a system of actuators for introducing "tensioning" stress distribution into said blade and for automatical compensation for temperature expansions and manufacturing inaccuracies of said blade, said system of actuators mounted on said frame and acting as a couple, said couple applying a torsion to a noncutting section of said saw blade not supported by said wheels, forces representing said couple being of such magnitude to assure stable position of said saw blade on said wheels.

2. The bandsaw mechanism of claim 1 wherein actuators of said system of actuators are pivotally connected to sliding pads.

3. The bandsaw mechanism of claim 1 wherein said section is opposite to cutting section of said saw blade.

4. The bandsaw mechanism of claim 1 wherein one force of said couple causes saw blade edge bending in the same sense as bending over said wheels, said edge carrying saw teeth.

5. The bandsaw mechanism of claim 2 wherein said sliding pads rotate, each pad rotates about an axis laying in a symetry plane of said system of actuators, said axis being parallel to said noncutting section of said saw blade.

6. The bandsaw mechanism of claim 1 wherein actuators of said system of actuators connected to rollers, said rollers applying said forces to said saw blade.

7. The bandsaw mechanism of claim 6 wherein said rollers coated with a layer of material more flexible than roller body.

8. In a bandsaw mechanism of claim 1, a blade position control system comprising a displacement transducer and a signal processing unit connected to said system of actuators, said displacement transducer mounted on said frame so as to sense the position of said saw blade on said wheels, said signal processing unit regulating one force representing said couple in accordance with an output of said displacement transducer.

9. In a bandsaw mechanism having a frame and a saw blade trained over two wheels, a system of actuators for introducing "tensioning" stress distribution into said blade and for automatical compensation for temperature expansions and manufacturing inaccuracies of said blade, one or both of said two wheels being tilted to cause higher tensile stresses at one edge than at the other edge of said saw blade, said system of actuators mounted on said frame and applying a force to said other edge of a noncutting unsupported section of said saw blade, said force causing blade twisting, said force being of such magnitude to assure stable position of said saw blade on said wheels.

10. In a bandsaw mechanism having a frame and a saw blade trained over two wheels, a system of actuators for introducing "tensioning" stress distribution into said blade and for automatical compensation for temperature expansions and manufacturing inaccuracies of said blade, said system of actuators mounted on said frame on one side of noncutting unsupported section of said saw blade, said system of actuators divided into two parts, said parts located in two planes parallel to each other, said planes being perpendicular to the surface of said section of said blade and perpendicular to the edges of said section of said saw blade, both said parts applying forces in the same direction, each said force causing partial twisting of said saw blade, ratio of said forces being such as to assure stable position of said saw blade on said wheels.

* * * * *